Feb. 21, 1928.
A. B. HURLEY
1,659,734
METHOD OF EYE PROTECTION AND MEANS FOR PRACTICING SAME
Original Filed Aug. 18, 1924
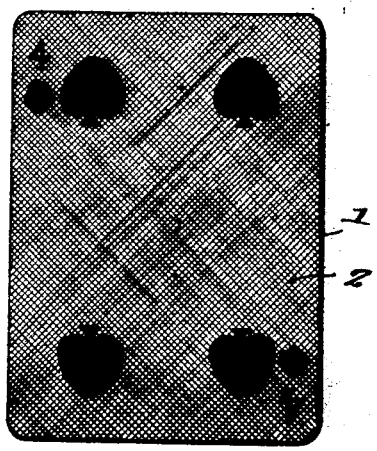
Fig. 1.
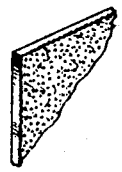
Fig. 2.
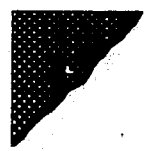
Fig. 3.
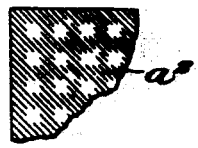
Fig. 6.
Fig. 4.
WHITE BACKGROUND
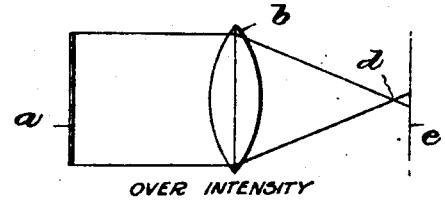
Fig. 4.ª
OVER INTENSITY
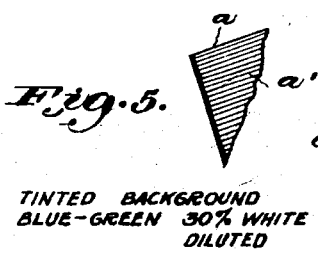
Fig. 5.
TINTED BACKGROUND
BLUE-GREEN 30% WHITE
DILUTED
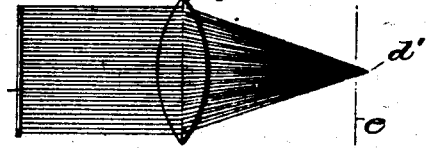
Fig. 5.ª
UNDER INTENSITY
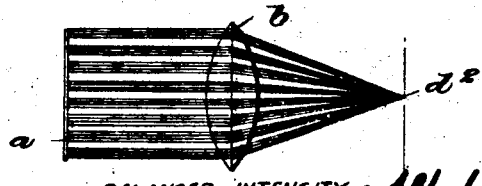
Fig. 6.ª
BALANCED INTENSITY
Inventor
Albert B. Hurley
Edward E. Clark
By
Attorney Patented Feb. 21, 1928.

1,659,734

UNITED STATES PATENT OFFICE.

ALBERT B. HURLEY, OF NEW YORK, N. Y., ASSIGNOR TO HURLEY PLAYING CARD COMPANY, OF RUTHERFORD, NEW JERSEY, A CORPORATION OF NEW JERSEY.

METHOD OF EYE PROTECTION AND MEANS FOR PRACTICING SAME.

Application filed August 18, 1924, Serial No. 732,775. Renewed July 12, 1926.

My invention relates to the art of optics and particularly to the application of certain principles of balanced colors and balanced intensities with respect to their physiological effect on the eye and the resultant effect on the nervous system. It has for its object to relieve nerve tension and lessen or prevent fatigue when the eye is exposed simultaneously or in rapid alternation to light of different intensities and different colors, as for example in playing games of cards according to customary methods.

I attain my object, and satisfy the foregoing requirements by regulating the hue, saturation and brightness of the light reflected from the surfaces exposed to high illumination, and thereby in a manner which will be presently described regulate the percentage difference in physiological effect. More specifically stated, I use a light filter or color screen for reflecting surfaces which are not required to reflect the full effect of high illumination, and I arrange this color screen so that a certain percentage of white or normal light may be reflected from said surfaces without change. I have found that by regulating the amount of this pure white light that is reflected, the stimulus due thereto can be increased or reduced to any desired degree, without affecting the amount of light reflected from particular objects such as the spots on cards which require high visibility and therefore call for maximum illumination and reflection.

Since the terminology of color is not yet standardized the following definitions are given for the terms hue, saturation, and brightness, used herein: By hue is meant the color itself as suggested by its name. The saturation or purity is a measure of the relative amount of white in the color mixture. On diluting a color with white, tints are obtained; that is tints are unsaturated colors. By brightness is meant the degree of intensity of illumination, which can be found by comparing it by means of a photometer with a surface of known brightness, its reflection coefficient for a standard white light being taken into account in comparing it with other colors in this respect. (See Luckiesh "Color and its Applications," New York, D. Van Nostrand, 1921).

It has been found in practice that by means of this invention the same beneficial effects obtainable by the use of the Cooper-Hewitt mercury vapor lamp can be secured without the depressing effect, of general illumination by Cooper-Hewitt light which lacks red rays, and with the added advantage of regulability.

The mode of application of my invention to such purpose as a game of cards is illustrated in the accompanying drawings, in which:

Fig. 1 shows a surface treated to break up and subdivide the reflected light, filtering out longer waves from part thereof.

Fig. 2 shows an enlarged fragment of a surface treated to diffuse the reflected light.

Fig. 3 is an enlarged fragment of a surface having mixed absorption dots to produce the same result as Fig. 1.

Fig. 4 is a fragment of a surface with a pure white background.

Fig. 4$^a$ is a diagram illustrating the effect on the eye of the light rays reflected from Fig. 4.

Fig. 5 is a fragment of a surface with a tinted background.

Fig. 5$^a$ is a diagram illustrating the effect on the eye of the light rays reflected from Fig. 5.

Fig. 6 is a fragment of a surface with a screened background, according to my present invention.

Fig. 6$^a$ is a diagram illustrating the effect on the eye of the light rays reflected from Fig. 6.

The filter medium may be constructed in several ways, all based on the same principles, but what now seems to me the best way is illustrated in Figs. 1, 2 and 3, wherein I have shown a surface 1 having applied to it a grid of light absorbing members 2, which by their crossing and interlacing form small open squares of natural or white surface. The width or thickness of each of the members 2, and the number of these to the unit of surface determine the dimensions of the enclosed squares and therefore the percentage of pure white light which will be reflected according to the nature of the natural surface. This surface being white this means that the percentage of pure white light reflected can be accurately controlled, to produce a proper degree of stimulation of the controlling nerve centers which regulate the iris or aperture of the eye. It is obvious that if desired the reverse of this arrangement may be used, by applying properly related squares of light absorbing medium so as to leave the grid white or of the natural color of the surface. I do not consider this however as desirable as the first method for various reasons.

Another way of making the color screen or filter is by producing upon the reflecting surface a mixture or mosaic of white spots and light absorbing spots in the same relative proportions as the grid and the squares in the grid of Fig. 3. A relative measure of fineness is the photoengraver's screen mesh, and I have found that dimensions corresponding to those of 65 to 100 mesh produce satisfactory results, provided that the width and light absorbing quality of the mesh lines are regulated as hereinbefore pointed out.

The spots on the cards, or the objects on a sheet thus treated are unaltered, so that the normal coefficient of reflection applies to each one according to its own hue, saturation and brightness. The color filter, in other words is used particularly on the background. It is to be recalled that calendered paper or playing card board is glazed, and even unglazed board if perfectly white has a very high coefficient of reflection, reaching .90 or .95. Such reflection from the field is not required in service, and a large amount of excess light is thus thrown off, which produces a stimulus which is most important to control.

The color filter which I have found most effective is one in which the cross lines absorb practically all the red rays and a considerable proportion of the yellow rays, so that the reflected rays produce the effect of bluish green or greenish blue. The white light reflected from the squares between the meshes affects this in the following manner: Under moderate illumination by white light, which may be assumed to include good artificial illumination, the surface will appear faintly tinted but with a "depth" or "life" which makes the objects or symbols borne thereon assume sharp definition. Exposed to strong or high illumination, as by direct sunlight or a nearby bright tungsten lamp, the impression of color vanishes, as the amount of white light reflected increases, and I have found by actual experiment that the mental impression of pure white light is produced under strong illumination with an 85 mesh color screen; while the strength of the stimulus is reduced well below the point of retinal fatigue of failure of the iris muscles to act, or so called dazzling. This effect can be confirmed by holding the surface under test in a fixed position under high illumination and moving a perfectly white surface toward it. The eye at once responds to the higher stimulus due to the increased amount of white light and the mental impression of color or shade is produced by comparison with respect to the white surface. As the white surface is then moved away, all impression of color vanishes, and within a period varying with the degree of over stimulation, the mental impression again becomes that of pure white light.

For the specific purpose of regulating brightness of the reflected light, the same may be diffused by somewhat breaking the surface, as indicated in Fig. 2. One reason for using this means is to compensate for the glaze. It is not essential to the practice of the invention.

Figs. 4, 5, and 6 show fragments of surfaces with their backgrounds "white", "tinted" and "screened" respectively and the corresponding Figs. 4$^a$, 5$^a$, and 6$^a$ are diagrams illustrating the respective effects of light rays transmitted from the surfaces shown in Figs. 4, 5, and 6. In Fig. 4, $a$ is the white background; an edge view of which is shown in Fig. 4$^a$. The rays of light transmitted therefrom make for an over intensity, so that the image is not clear upon the retina but as indicated symbolically at $d'$, is improperly received by the retina.

In Fig. 5, $a$ is the surface, having a background $a'$ tinted blue-green 30% white diluted. This tint although overcoming the fault of the surface of Fig. 4, that is, the resultant over intensity, results in the opposite fault of under intensity, as is symbolized in Fig. 5$^a$. The rays are transmitted from surface $a$ and passed to the lens $b$ and from thence toward the retina $e$, but the transmitting surface being tinted in the aforesaid manner the image is not clear upon the retina, but as indicated symbolically at $d'$ is improperly received by the retina.

In Fig. 6, the background is shown with a pure white surface partially covered by a screen or grid $a^2$, shown in the figure greatly enlarged. In practice the individual members of this screen or grid are not perceptible to the naked eye, being of such dimensions as to leave approximately 25% of the pure white surface exposed, which of course will reflect pure white light. The screen constitutes a color filter, which I make of a tint known in the trade as blue green 30% white diluted. Hence those parts of the surface which are covered by the screen or grid reflect only pale blue green light. The effect of this tinted grid with its enclosed and distributed white spaces is to produce a fine mosaic or checkerboard effect of mingled white and tinted spots, the white light remaining however undiluted by the tinted light, and producing the effect on the retina and the proper stimulus to adjustment of the iris and lens, due to white light in the quantity thus transmitted. The limit of fineness is that beyond which the mosaic of white squares is too small to be perceived, and the limit of coarseness is that beyond which the total area of white surface exposed and necessary to produce balanced and normal action in the eye is exceeded. I have found in actual practice, using the photo engraver's screen mesh as a standard of measurement, that a grid or color filter $a^2$ of the tint mentioned, with its lines and enclosed white squares equal in width, and of a fineness between eighty five and a hundred per inch, is suitable for my purpose.

It will be understood that I am not limited to the specific means for practicing my method as hereinafter claimed. The gist of the invention lies in the use of a light filter or color screen so arranged mechanically as to reduce the amount of white light directly reflected from uncovered portions of the background surface, and at the same time to absorb a portion of the stronger color waves reaching the covered portions of the surface, so as to reduce retinal fatigue and bring the maximum and minimum stimuli to within the limits of normal adjustment of the eye.

What I claim is:

A white reflecting background surface bearing symbols and having imposed upon it a color screen or filter in the form of a grid adapted to uniformly absorb a portion of the longer waves of light to produce a uniformly distributed tint with enclosed and uniformly distributed white portions, the total area of said tinted grid and the total area of the white portions being to each other approximately as three to one, and the grid being of a fineness between eighty and one hundred mesh per inch.

In testimony whereof I hereunto affix my signature.

ALBERT B. HURLEY.